(No Model.)
S. E. HURLBUT.
TRAY FOR DRINKING GOBLETS AND GLASSES.
No. 264,163. Patented Sept. 12, 1882.
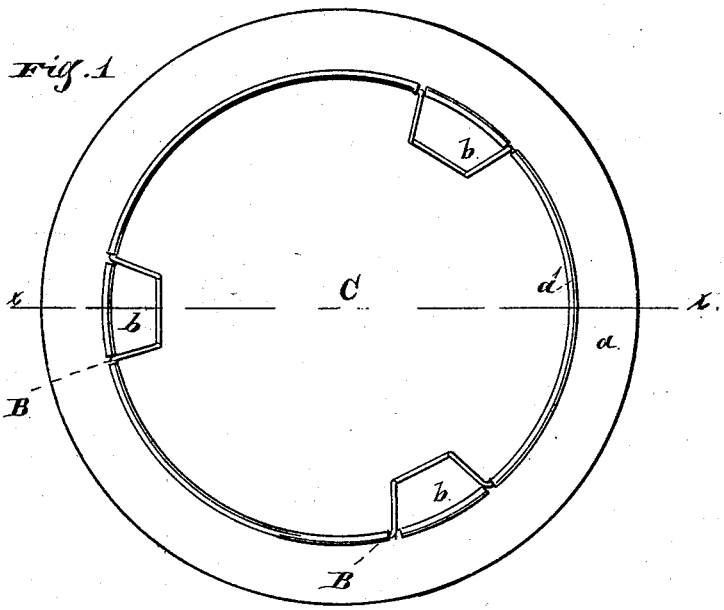
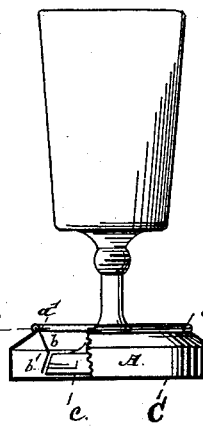
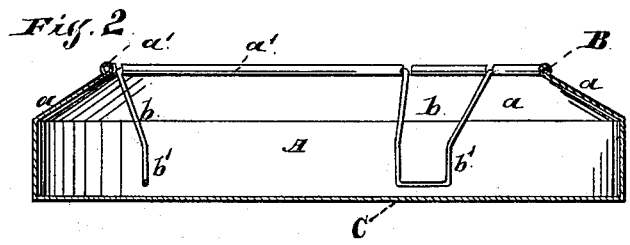
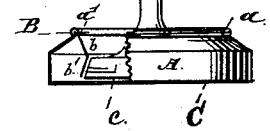
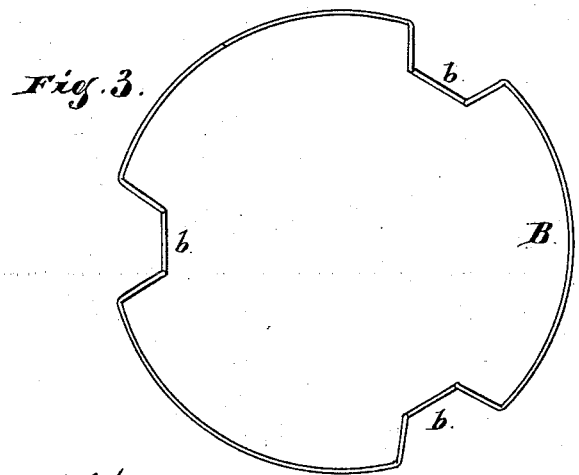
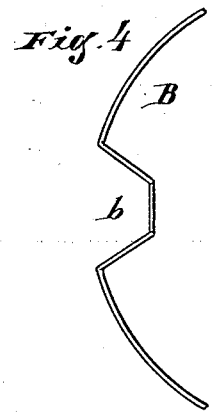
Witnesses:
Inventor:
Seth E. Hurlbut

UNITED STATES PATENT OFFICE.

SETH E. HURLBUT, OF CHICAGO, ILLINOIS.

TRAY FOR DRINKING GOBLETS AND GLASSES.

SPECIFICATION forming part of Letters Patent No. 264,163, dated September 12, 1882.

Application filed February 6, 1882. (No model.)

*To all whom it may concern:*

Be it known that I, SETH E. HURLBUT, a citizen of the United States, residing at Chicago, in the county of Cook and State of Illinois, have invented a new and useful Improvement in Trays for Drinking Goblets and Glasses, of which the following is a specification.

My invention relates to a tray which can be readily attached to and detached from drinking goblets and glasses by means of springs or other devices, and which, when so attached, will catch and retain within itself whatever overflow there may be from their contents. I attain this object by the mechanism illustrated in the accompanying drawings, in which—

Figure 1 is a top view of the device. Fig. 2 is a vertical section of Fig. 1 at the line marked $x$. Figs. 3 and 4 are details. Fig. 5 is a view of the device attached to a goblet and having a portion cut away, showing one of the attaching-springs and the base of the goblet at their junction.

Similar letters refer to similar parts throughout the several views.

A, Figs. 2 and 5, represents the side or wall of the tray.

$a$, Figs. 1, 2, and 5, represents the upper portion of the side or wall of the tray turned inward toward the center of the same, thereby forming a reservoir which will retain its contents when the tray is turned upon its edge.

B, Figs. 1, 2, 3, 4, and 5, represents the parts of the springs which are attached to the tray.

$b$, Figs. 1, 2, 3, 4, and 5, represents the parts of the springs which extend downward and inward toward the center of the tray.

$b'$, Figs. 2 and 5, represents the lower end of the springs turned to conform to the shape of the goblet or glass at their junction, thus holding the tray attached thereto.

$a'$, Figs. 1, 2, and 5, represents the upper edge of the tray turned over the wire which forms the springs and holding the same in place.

C, Figs. 1, 2, and 5, represents the bottom of the tray.

$c$, Fig. 5, represents the base of the goblet or glass at its junction with the spring at $b'$.

Fig. 3 represents the springs formed of one piece of wire. Fig. 4 represents the springs formed in sections.

The tray is attached by pressing the base of the goblet or glass downward on the springs, which causes them to be forced outwardly until the base of the glass reaches that portion of the springs marked $b'$, when they force themselves inwardly upon the base of the glass and hold the tray attached thereto, thereby intercepting and retaining within itself whatever overflow there may be from the goblet or glass and preventing it from dripping therefrom while the same is either standing or being used.

While I believe the springs herein described to be more suitable than any others, still I do not confine myself to the use of any particular form of springs. They may be made of rubber or any other suitable material and in various forms.

I do not confine myself to any particular material in the construction of the tray; neither is it necessary that its sides or wall be made solid to its bottom, as its bottom may be made of material that will absorb the overflow from the glass or otherwise, and removable from the sides or wall of the tray for convenience in cleaning.

What I claim as my invention, and desire to secure by Letters Patent, is—

A tray adapted to be attached to and detached from drinking goblets or glasses by means or equivalents substantially as described.

SETH E. HURLBUT.

Witnesses:
D. N. HURLBUT,
WILLIAM F. FUREY.